United States Patent [19]
De Simone et al.

[11] 3,836,892
[45] Sept. 17, 1974

[54] D.C. STABLE ELECTRONIC STORAGE UTILIZING A.C. STABLE STORAGE CELL

[75] Inventors: Roy R. De Simone, Burlington; Nicholas M. Donofrio; Richard H. Linton, both of Essex Junction; George Sonoda; William T. Wade, both of Poughkeepsie, all of N.Y.

[73] Assignee: International Business Machines Corporation, Armonk, N.Y.

[22] Filed: June 29, 1972

[21] Appl. No.: 267,719

[52] U.S. Cl. .......... 340/173 DR, 307/238
[51] Int. Cl. .......... G11c 11/40
[58] Field of Search .......... 340/173 R, 173 DR; 307/238, 279

[56] References Cited

UNITED STATES PATENTS

| | | | |
|---|---|---|---|
| 3,737,879 | 6/1973 | Greene | 340/173 DR |
| 3,528,065 | 9/1970 | Christensen | 340/173 R |
| 3,530,443 | 9/1970 | Crafts | 340/173 R |
| 3,541,530 | 11/1970 | Spampinato | 340/173 R |
| 3,550,097 | 12/1970 | Reed | 340/173 R |
| 3,699,544 | 10/1972 | Joynson | 340/173 R |
| 3,731,287 | 5/1973 | Seely | 340/173 DR |
| 3,748,651 | 7/1973 | Mesnik | 340/173 DR |
| 3,760,379 | 9/1973 | Nibby | 340/173 DR |

OTHER PUBLICATIONS

IBM Technical Disclosure Bulletin Vol. 15 No. 1, June 1972, pp. 257–258 "Storage Refresh Control of Synchronization" by T. V. Harroon.

*Primary Examiner*—Terrell W. Fears
*Attorney, Agent, or Firm*—Theodore E. Galanthay

[57] ABSTRACT

An electronic data storage which operates as a DC stable storage array, but retains the advantages of an AC stable storage cell circuit. The AC stable storage cells are regenerated at a frequency asynchronous with respect to the storage cycle time. Gating means inhibit the regenerating signals when the system desires access, thereby permitting the storage cells to be accessed for information at any time in a completely random access mode.

9 Claims, 3 Drawing Figures

PATENTED SEP 17 1974 3,836,892

SHEET 1 OF 2

D.C. STABLE ELECTRONIC STORAGE UTILIZING A.C. STABLE STORAGE CELL

Cross Reference to Related Applications and Patents

Spampinato et al. U.S. Pat. No. 3,541,530, issued on Nov. 17, 1970, assigned to the asignee of the present invention.

BACKGROUND OF THE INVENTION

1. Field of the Invention

This invention relates generally to electronic data storage systems and more specifically to a DC stable storage array utilizing AC stable storage cells. The advantages of a DC stable storage array that is randomly accessible at any given instant of time, are combined with the advantages of an AC stable storage cell, which takes up less semiconductor circuit area, requires less power to operate, has a faster cycle time, and provides non-destructive read-out.

2. Description of the Prior Art

The prior art abounds with numerous devices, systems and techniques for storing electronic data. For many years, ferrite core matrices dominated large random access storage systems. With the advent of integrated circuits and monolithic technology, thousands of active circuit devices, such as transistors, can be placed on a single semiconductor chip having an area as small as one hundred square mils or even less. It has thus become possible to fabricate bistable circuits, such as flip flops, of sufficiently small size and packaging density to compete favorably with the bistable ferrite cores used in core storage systems. These semiconductor storage cells are bistable circuits, the binary value of the stored data being determined by the state of the bistable circuit, when sensed. These bistable circuits may be functionally characterized as DC stable or AC stable. DC stable storage cells generally retain their data until it is altered by a "write" operation. On the other hand, AC stable cells retain the stored information only for limited intervals of time after which the information must be "refreshed" or it is permanently lost.

A prior art example of an AC stable storage is exemplified by the previously cross referenced U.S. Pat. No. 3,541,530. The patent relates to a four device field effect transistor (FET) AC stable storage cell that is entirely compatible with the present invention, and is hereby incorporated by reference.

AC stable storage cells generally have the advantage of minimizing stand-by power consumption, elimination of power sources normally required for DC stable cells and small lay-out area in the semiconductor chip because fewer semiconductor devices are required, resulting in increased packaging density. These advantages have sometimes been outweighed by the disadvantage that information is stored only for a limited period of time after which it must be "refreshed." Prior art techniques for refreshing AC stable storage cells utilize one of two basic techniques. The first such technique requires that the storage system reserve every alternate cycle for the refreshing or regeneration of data. This results in a variable access time to the storage. Namely, if the storage is available for accessing when the system requires it, then the minimum access time designed into the storage prevails. However, if the system desires to access the storage during a refresh cycle, then the delay of the refresh cycle is encountered in addition to the just mentioned minimum access time. This variable access time is highly undesirable to system designers. The second technique referred to as a burst mode of operation in which the memory is operated normally until restoring is needed, whereupon read/-write activity is stopped, and the information is restored to a large number of cells such as the whole memory, in parallel. This technique is also undesirable to system operation and, at best, requires that cycle times be increased to allow for the time required for regeneration.

SUMMARY OF THE INVENTION

It is therefore an object of this invention to provide an improved storage system utilizing AC stable storage cells.

It is a specific object of this invention to combine the system advantages of a DC stable storage cell with the circuit advantages of an AC stable storage cell.

It is a further object of this invention to regenerate an AC stable storage cell without affecting the accessibility of the cell to the system.

In accordance with the present invention, a storage array comprised of AC stable storage elements is systemmatically regenerated by a pulse train from an asynchronous pulse source. The frequency of the pulse source is determined primarily by the retention time of each AC stable cell and the time interval required to regenerate it, although other factors are considered for optimization. Whenever the system desires access to the storage array, the regenerating pulses are inhibited. At no time is the system accessing signal to the storage array ever delayed because of the presently described regeneration technique.

DESCRIPTION OF THE PREFERRED EMBODIMENT

Figure 1:
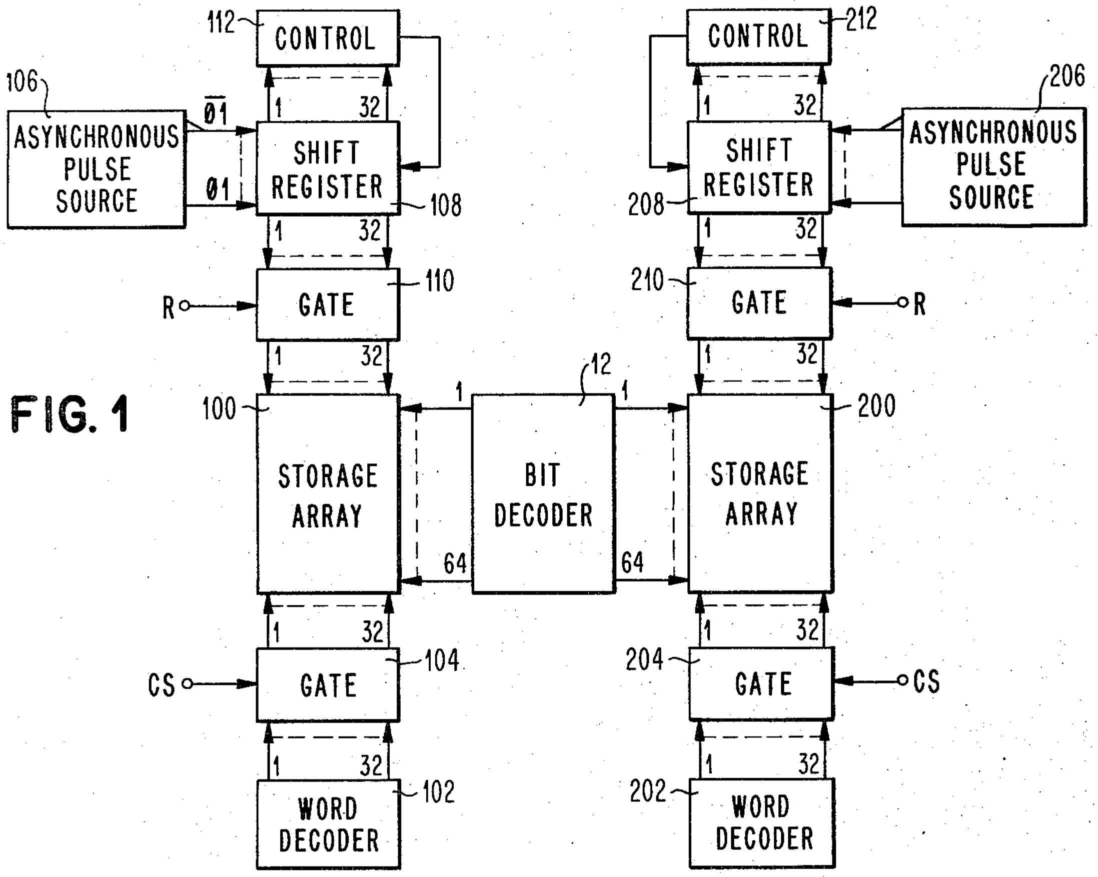
FIG. 1 is a block diagram schematically representing a storage array and associated circuitry.

Refer now to FIG. 1 for a general description of the present invention. Storage array 100 and storage array 200 each comprise a plurality of AC stable storage cells. As shown, there are 64 pairs of bit/sense (B/S) lines from bit decoder 12 to each array. There are also 32 word lines (W/L) entering each array from word decoder 102 through gate 104 and word decoder 202 through gate 204, respectively. Each array is therefore capable of storing 64 × 32 bits of information, being equal to 2,048 and commonly referred to as a 2K bit array. The density of integration is limited only by existing technology. If the technology is limited to 512 bits on a single semiconductor chip, then storage array 100 would require four chips. On the other hand, the entire circuit of FIG. 1 is placeable on a single semiconductor ship of appropriate size, with appropriate technology. Whatever number of cells are placed on a particular chip, the corresponding associated support circuitry for those bits would be on the same chip. Similarly the associated regeneration circuitry is on the same chip with the cells to be regenerated. With continued reference to FIG. 1, the regeneration circuits are described. Asynchronous pulse source 106 provides two sets of pulse trains to shift register 108. A 32 bit shift register is shown to accommodate the 32 word lines. Each of the 32 outputs of shift register 108 is connected to a corresponding word line through gate 110. As shown, control circuit 112 receives an input from each of the outputs of shift register 108 and provides an input signal thereto. As will be explained later herein, for purposes of saving power, it is preferred that only one of the outputs of shift register 108 contain a binary "1," while the remaining outputs provide "0." This function could be accomplished in any one of a number of well known ways. As shown here, control circuit 112 inserts a "1" into the first stage of shift register 108 and reinserts a "1" as the previously inserted "1" is shifted out of the last stage. Thus, control circuit 112 may comprise an exclusive OR circuit which provides a "1" output only when all 32 inputs are "zeroes." In the alternative, shift register 108 is of the recirculating ONE type so that once a "1" is inserted it continues to be reinserted into the first stage as it is shifted out of the last stage. These details of shift register operation and control are well known to those skilled in the art.

The regenerating means for storage array 200 comprise asynchronous pulse source 206, shift register 208, gate 210, and control circuit 212, all the foregoing connected in a manner corresponding to the regenerating means for storage array 100. Those skilled in the art will further recognize that a single 64 bit shift register requiring a single shift register control circuit and a single asychronous pulse source operating at twice the frequency would be equivalent structure and provide the identical desired result. The various gate circuits shown in FIG. 1 require a gating element corresponding to each word line as is more clearly shown in FIG. 2.

Figure 2:
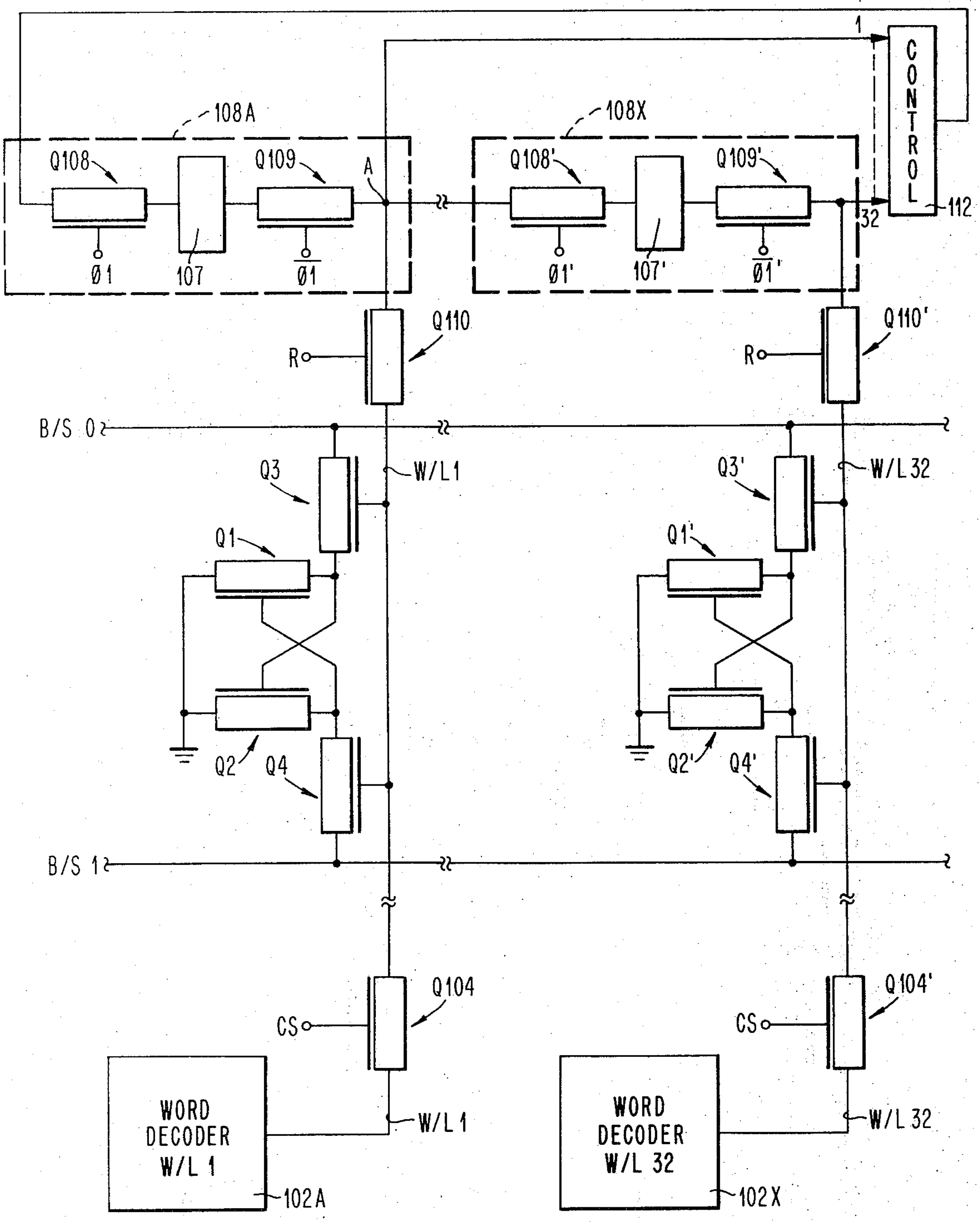
FIG. 2 is a circuit diagram showing a portion of FIG. 1 in greater detail.

Referring now to FIG. 2, there is shown a portion of FIG. 1 in greater detail. Corresponding portions have been labelled with corresponding reference numerals insofar as possible. FIG. 2 shows two AC stable storage cells out of the 2,048 in array 100. The first cell comprises cross coupled transistors Q1 and Q2 connected to transistors Q3 and Q4. The second cell comprises transistors Q1′, Q2′, Q3′ and Q4′. Note that all transistors shown are field effect transistors (FET's) and the cell itself is identical to that shown in the aforementioned U.S. Pat. No. 3,541,530. It is important to note that the present invention is useful with any AC stable cell. In fact, so long as an AC stable cell has three terminals, it is directly "plug substitutable" for the structure shown.

Decoder 102A represents a section of decoder 102 associated with word line 1. The output of the word decoder 102A is applied to one of the gated terminals of transistor Q104 which represents the portion of gate 104 associated with word line 1. The other gated terminal of Q104 is connected to the array side of word line 1, specifically, 64 cells in series. Q104 receives a gating pulse CS, also referred to as ship select, when the system desires to access the array.

Shift register stage 108A represents the first stage of shift register 108, while stage 108X represents the thirty-second stage. As will be readily apparent, any shift register known to those skilled in the art would perform the intended function. In the presently disclosed shift register, a two phase shift register is shown having an input transistor Q108, a storage portion 107, and an output transistor Q109. A number of such two phase shift registers are well known in the art. Note that field effect transistors are shown throughout, each having two gated terminals and one gating terminal. The gated terminal of Q108 receives a gating pulse from asychronous pulse source 106 on its gating terminal. Similarly, transistor Q109 receives a gating pulse from asychronous pulse source 106. The gating terminals have been labelled with the terminology phase 1 and NOT phase 1 to indicate that one of the outputs asynchronous pulse source 106 is always the inverse of the other. Q110 is the transistor associated with word line 1 in gate 110. The gated terminals of Q110 are connected, one to the output of the first stage of shift register 108, the other to word line 1 to the array. The gated terminal of Q110 receives a restore pulse R. For the purposes of this invention, it is sufficient to state that pulse R and pulse CS are out of phase, not occurring simultaneously, so that only one of transistors Q104 or Q110 can be on at any one time. As a practical matter, pulses R and CS are available in the storage system and do not have to be specifically generated for the purposes of this invention. The structure of shift register stage 108X is identical in every respect to 108A except that it represents the thirty-second stage of shift register 108. Transistor Q110′ is the counterpart of Q110 and is associated with word line 32.

OPERATION

In accordance with the present invention, an AC stable storage cell is operated as a DC stable storage array. Basically, an AC stable storage cell requires periodic regeneration. In a DC stable storage array, all the storage locations are available for accessing by the system through addressing means such as word decoders and bit decoders. By the present technique, regenerating means are provided for periodically regenerating at least selected ones of the storage cells in an array and gating means are provided for inhibiting the regenerating means, when the storage array is accessed by the system. With reference to FIG. 1, the regenerating means includes asynchronous pulse source 106, shift register 108 and control 112 therefore, and gate 110. As previously explained, shift register 108 and control 112 are schematically represented to show a circulating ONE shift register or equivalent thereof to perform the function of periodically accessing one of the 32 word lines shown.

In the normal operation of storage array such as storage array 100, the system accesses storage cells in the array through word decoder 102 and bit decoder 12. Additionally, to select a particular array or group of arrays, from the total number of storage arrays available to a system, a third accessing signal is used. If the array(s) to be accessed are all on the same monolithic chip, this third accessing signal is frequently referred to as chip select (CS). The present invention uses the chip select signal (CS) as an input to gate 104. In the internal operation of the circuit within word decoder 102, there is also available a pulse that is always out of phase with the chip select pulse and is conventionally referred to as a restore pulse (R). In the normal operation of the word decoder, this restores the word driving circuits for the next accessing cycle by the system. An example of a suitable driver circuit is found in Sonoda U.S Pat. No. 3,564,290 issued on Feb. 16, 1971. For the purposes of the present invention, it is not necessary to utilize any particular word decoder. It is, however, important to have a restore pulse (R) available to gate 110. If a restore pulse (R) is not already available, then it must be generated. Since the R pulse is always out of phase with the CS pulse, those skilled in the art will recognize that numerous circuits for inverting a pulse, or series of pulses such as CS, to obtain an out of phase pulse or series of pulses R are available.

From the foregoing, it is immediately apparent that only one of gates 104 or 110 can access storage array 100 through one of word lines 1–32, at any given time. Referring now to FIG. 2, the operation of the present invention will be described in greater detail. Word line W/L 1 and word line W/L 32 are shown with their associated shift register and gating stages. Assume for purposes of example that control circuit 112 has just applied a "1" level signal to one of the gated terminals of transistor Q108. A "phase 1" gating signal from the asynchronous pulse source 106 then applies the "1" level signal to the storage section 107 of shift register state 108A. As the asynchronous pulse train switches state, the "NOT phase 1" signal applied to the gating terminal of Q109 transfers the "1" level signal to node A. This "1" level signal is applied to: one of the gated terminals of Q110, the next shift register stage, and one of the inputs to control 112. The output of control 112 will therefore continue to provide a "0" level signals to Q108, so long as any of the shift registers contain a "1." Of course, the main reason for having only one "1" recirculating through the shift register is to save power. It is well known to those skilled in the art to design a shift register having a plurality of "1's" circulating. The "1" level signal at node A is also gated through transistor Q110 by a gating signal R, which is out of phase with the gating signal CS, as previously described. The gating signal R is of sufficient duration to fully regenerate the cell which is comprised of transistors Q1, Q2, Q3 and Q4. Since there is no D.C. path to ground, the "1" level signal at node A is not discharged by regenerating the cell, and is transferred to the next shift register stage.

The A.C. stable storage cell in this example is referred to as a "four device" cell. This is a well known AC stable storage cell which is regenerated by pulsing the gating terminals of transistors Q3 and Q4. It is also known that the regenerating pulse must occur at certain minimum intervals and be of a certain minimum width (time duration). The gating signal R and the interval that node A is at the "1" level must therefore be of sufficient width coincidentally to assure regeneration of the cell. The frequency with which node A will be at the "1" level depends on the frequency of operation of asynchronous pulse source 106. The cell is also refreshed by a pulse on word line W/L 1 from the system through word decoder 102 and gating element Q104 in the presence of gating pulse CS. However, this mode of regeneration is completely random and cannot be relied upon. From the foregoing, it is clear that a regeneration pulse must be systematically applied to the storage array regardless of the condition of the cells due to system accessing.

Figure 3:
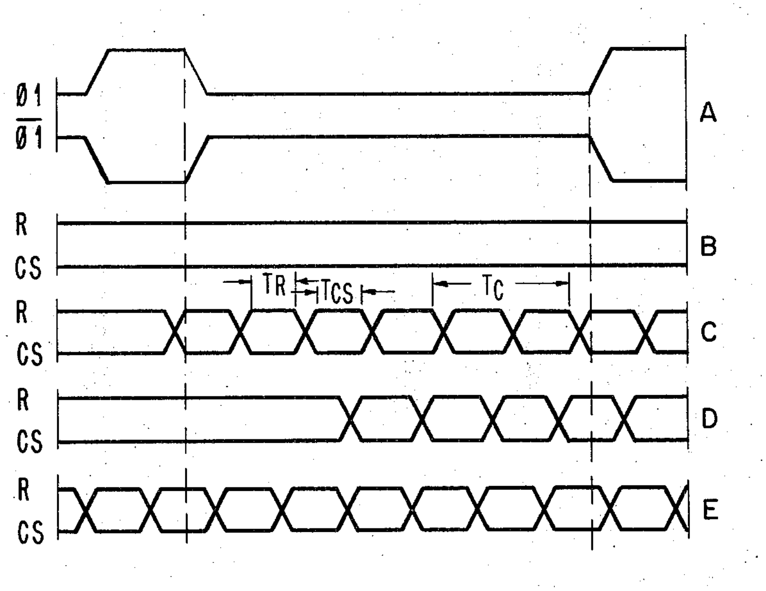
FIG. 3 is a waveform diagram.

Refer now to FIG. 3 for waveform diagrams showing various relationships between system accessing and the asynchronous regeneration mode. Waveform A depicts the output of asynchronous pulse source 106. The phase 1 and NOT phase 1 waveforms shift the shift register 108. Assume for purposes of the present example that the up level of the phase 1 pulse shifts a "1" into the storage section of the first stage of the shift register. The immediately following up level of the NOT phase 1 pulse shifts this "1" level to node A. The output of pulse source 106 has been shown as an asymetrical pulse in order to increase the time available for regenerating during any given cycle in the output of pulse source 106.

In waveform B, it is seen that the system is not addressing the storage. Accordingly, the chip select signal CS remains down while the restore signal R remains at an up level. The gating means, transistor Q110, therefore brings word line 1 to an up level for the entire duration of the NOT phase 1 pulse. This interval has been shown in FIG. 3 as several times the time duration required to refresh the storage cells attached to word line 1, resulting in a successful refresh cycle. The minimum time required for refreshing the storage cells is variable with their particular construction. As will be seen from the description of the additional waveforms in FIG. 3, the minimum time that the NOT phase 1 signal (and thereby node A) must be maintained in an up level is the sum of the minimum time required to refresh the cell ($T_R$) and the cycle time ($T_C$) of the storage. In the example of FIG. 3, therefore, the NOT phase 1 pulse is in an up level for a longer period than required.

In waveform C, the system addresses the storage at the beginning of refresh time. Note that "refresh," "restore," and "regenerate" are used synonymously herein. Therefore, the refresh cycle brings the restore pulse R to an up level resulting in refresh time ($T_R$). Note again that the R pulses and CS pulses are out of phase, although it is not required that they be of identical time duration, as shown. It is only necessary that the restore pulse R remain at an up level long enough to fully regenerate the cells.

Waveform D shows the condition in which the system addresses the storage during refresh time. As shown, the storage is fully refreshed before the occurence of the CS pulse inhibits the refresh pulse. However, if the CS pulse occurred even earlier to inhibit the refresh pulse before it had arrived at its minimum time duration of $T_R$, then it is seen that during subsequent cycles the storage would still be refreshed.

The waveform E demonstrates the state in which the system can continuously address the storage. In this condition, the R pulse also gates the refresh pulse for a time adequate to refresh the cells. Additionally, the cells are refreshed by the normal operation of the signal gated by the CS pulse through transistor Q104 for word line 1.

In the description of the waveforms of FIG. 3 the minimum duration of the up level of the NOT phase 1 pulse was specified. The minimum up level of the phase 1 pulse is determined by the particular two phase shift register that is selected. Basically, the phase pulse 1 must remain at an up level for a sufficient duration to transfer the signal from the input gated terminal of FET Q108 to the output gated terminal of Q108 into storage section 107. The total minimum up level times of the phase 1 and NOT phase 1 pulses are the minimum cycle time of asynchronous pulse source 106. The maximum frequency of pulse source 106 is therefore the inverse of the minimum cycle time. Furthermore, with the present example providing that only one "1" signal is circulating in shift register 108, then the number of word lines that can be regenerated by a single shift register, at the maximum frequency of pulse source 106, is determined by how frequently a particular word line must be refreshed.

The time interval within which a given cell must be refreshed can be expressed by the formula:

$$i = C \times dv/dt$$

where $i$ is the leakage current, $C$ is the storage capacitance of the cell, $dv$ is the amount of change in voltage that can be tolerated, and $dt$ is the time interval within which the cell must be refreshed.

In the embodiment of FIG. 1 utilizing a 32 stage shift register, the minimum frequency of pulse source 106 must therefore be 32 times $dt$. So long as this minimum frequency does not exceed the maximum frequency previously described, a viable design is obtained. For optimization, so that a single shift register can refresh the maximum number of word lines, the minimum frequency required should approach the value of the maximum possible frequency. For the general case in which $n$ = the total number of word lines (rows of storage cells) in the storage array, and $m$ = the number of rows of cells to be refreshed at any one time, then the minimum frequency output required from pulse source 106 will be $n/m$ times the minimum frequency required if only one row at a time is refreshed. The simultaneous refreshing of more than one word line in a storage system is achieved by either using a plurality of shift registers for separate arrays as shown in FIG. 1, or, in the alternative, using one large continuous shift register for the entire storage system and, having " 1" level signals spaced in accordance with the just described requirements.

What has then been described is an electronic data storage array comprising AC stable storage cells but operable as a DC stable array. The refreshing of the AC stable cells is performed by the method of generating a pulse train at a frequency that is asynchronous with the cycle time of the storage array, applying the refreshing signal to at least one row of cells at a time, and inhibiting the refreshing signal whenever the storage is selected by the system. Structurally, all that is required is a regenerating means such as the pulse source-shift register combination disclosed herein for periodically regenerating at least selected ones of the storage cells, and gating means for inhibiting the regenerating means when the storage array is accessed by the system.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an electronic data storage array, having a plurality of storage cells requiring periodic regeneration, and having means through which said array is accessed by the system, the improvement comprising:

regenerating means, including a pulse source for generating a train of pulses, that is asynchronous with the cycle time of the storage array, for periodically regenerating at least selected ones of said storage cells; and gating means for inhibiting said regenerating means, when the storage array is accessed by the system.

2. Apparatus as in claim 1 wherein said regenerating means systematically regenerates one row of storage cells in said array at any given time.

3. Apparatus as in claim 1 wherein the regenerating means further comprises:

shift register means responsive to said pulse source, for circulating at least one "1" level signal at a shift rate determined by the frequency of said pulse source.

4. Apparatus as in claim 1 wherein said gating means is a single field effect transistor.

5. Apparatus as in claim 1 in which said gating means are complementary gating means such that the signal from the means through which said array is accessed by the system and the signal from the regenerating means are each gated in a complementary manner, thereby permitting the regenerating means to access the storage array only when it is not required by the system.

6. The method of refreshing AC stable storage cells in a storage array operable as a DC stable storage, comprising the steps of:

generating a pulse train at a frequency that is asynchronous with the cycle time of the storage array;

applying at least one of said pulses in said pulse train, as a refreshing signal, to at least one row of said cells in said array; and inhibiting the refreshing signal whenever the system desires access to the storage.

7. Method as in claim 6 wherein each of the storage cells to be refreshed has a particular data retention time, said cells being arranged in the storage array having N rows of word lines, M rows of cells to be refreshed at any given time, the step of generating a pulse train being at a frequency such that the minimum frequency is a direct function of the shortest data retention time of one of said cells, and an inverse function of the number of rows of cells to be refreshed at any given time.

8. Method as in claim 6 in which the maximum frequency of said pulse train is a function of the minimum time required to refresh one of said cells.

9. Method as in claim 6 in which said asynchronous pulse train is also asymmetric.

* * * * *